United States Patent
Lin et al.

(10) Patent No.: US 10,984,217 B2
(45) Date of Patent: Apr. 20, 2021

(54) OPTICAL FINGERPRINT SENSOR AND FINGERPRINT IDENTIFICATION METHOD THEREOF

(71) Applicants: Egis Technology Inc., Taipei (TW); Igistec Co., Ltd., Hsinchu County (TW)

(72) Inventors: Yu-Hsuan Lin, Hsinchu County (TW); Tang-Hung Po, Hsinchu County (TW); Chung-Yi Wang, Hsinchu County (TW)

(73) Assignees: EGIS TECHNOLOGY INC., Taipei (TW); IGISTEC CO.. LTD., Hsinchu County (TW)

( * ) Notice: Subject to any disclaimer, the term of this patent is extended or adjusted under 35 U.S.C. 154(b) by 67 days.

(21) Appl. No.: 16/523,425

(22) Filed: Jul. 26, 2019

(65) Prior Publication Data
US 2020/0097697 A1    Mar. 26, 2020

Related U.S. Application Data

(60) Provisional application No. 62/734,270, filed on Sep. 21, 2018.

(30) Foreign Application Priority Data

Jun. 14, 2019 (CN) .......................... 201910516417.6

(51) Int. Cl.
*G06K 9/00* (2006.01)
*G06F 3/041* (2006.01)

(52) U.S. Cl.
CPC ....... *G06K 9/00087* (2013.01); *G06K 9/0002* (2013.01); *G06K 9/0004* (2013.01); *G06F 3/041* (2013.01)

(58) Field of Classification Search
CPC ............ G06K 9/00087; G06K 9/0002; G06K 9/0004; G06F 3/041
See application file for complete search history.

(56) References Cited

U.S. PATENT DOCUMENTS

2014/0375571 A1* 12/2014 Hirata ..................... G06F 3/041
345/173
2016/0140376 A1* 5/2016 Kremin ................ G06K 9/0002
382/124

(Continued)

*Primary Examiner* — Antonio Xavier
(74) *Attorney, Agent, or Firm* — WPAT, PC

(57) ABSTRACT

An optical fingerprint sensor and a fingerprint identification method are provided. The optical fingerprint sensor includes a photosensitive element and a signal processing circuit. The signal processing circuit includes a logic unit, a variable/programmable gain amplifier and a processing unit. The logic unit is electrically coupled to the photosensitive element. The variable/programmable gain amplifier is electrically coupled to the logic unit. The processing unit is electrically coupled to the variable/programmable gain amplifier and the logic unit. The variable/programmable gain amplifier adaptively switches a gain between a first gain value and a second gain value, wherein the second gain value is larger than the first gain value. After the signals inputted into the variable/programmable gain amplifier are properly processed according to the first gain value or the second gain value, the optical fingerprint sensor acquires a sharp sensing image.

14 Claims, 7 Drawing Sheets

(56) References Cited

U.S. PATENT DOCUMENTS

2017/0061188 A1* 3/2017 Kremin ................ G06F 3/0418
2018/0164915 A1* 6/2018 Karpin ................ G06F 3/0446
2019/0012512 A1* 1/2019 He ...................... G06K 9/0004

* cited by examiner

OPTICAL FINGERPRINT SENSOR AND FINGERPRINT IDENTIFICATION METHOD THEREOF

CROSS-REFERENCE TO RELATED APPLICATION

This application claims priority to U.S. Provisional Patent Application No. 62/734,270 filed Sep. 21, 2018, and Chinese Patent Application No. 201910516417.6 file Jun. 14, 2019, the contents of which are incorporated herein by reference.

FIELD OF THE INVENTION

The present invention relates to a fingerprint identification technology, and more particularly to an optical fingerprint sensor and a fingerprint identification method.

BACKGROUND OF THE INVENTION

With the advancement and development of science and technology, an image sensing technology is widely used in the field of biometric identification. As known, an optical fingerprint sensor is used to identify the changes of ridges, valleys and protrusion lines. Consequently, the optical fingerprint sensor plays an important role in the security of the mobile device.

FIG. 1 is a schematic circuit diagram illustrating the conventional optical fingerprint sensor. The optical fingerprint sensor 1 includes a photosensitive element 11 and a signal processing circuit 12. The signal processing circuit 12 is electrically coupled to the photosensitive element 11. The photosensitive element 11 includes a plurality of photosensitive pixels 111 in an array arrangement. During the operation of the optical fingerprint sensor 1, the photosensitive element 11 is exposed to the light beams. According to the light amount received by each photosensitive pixel 111, each photosensitive pixel 111 outputs a pixel signal S11 to the signal processing circuit 12. Since the pixel signal S11 outputted from the photosensitive pixel 111 is an analog signal, the signal processing circuit 12 includes an analog front end (AFE) circuit 121 for converting the pixel signal S11 from analog-form into digital-form. After the pixel signal S11 is processed in a subsequent step, a fingerprint image is acquired.

Please refer to FIG. 2. FIG. 2 is a schematic circuit diagram illustrating the analog front end circuit of the optical fingerprint sensor as shown in FIG. 1. The analog front end circuit 121 includes an amplifier 1211 and an analog-to-digital converter (ADC) 1212. The amplifier 1211 is electrically connected between the photosensitive element 11 and the analog-to-digital converter 1212, and the amplifier 1211 is configured to amplify the pixel signal S11 so as to adjust the pixel signal S11 lies in the input range of the analog-to-digital converter 1212. However, the conventional optical fingerprint sensor 1 still has some drawbacks. For example, if the magnitude difference between two pixel signals S11 from the photosensitive pixels 111 is much lower than the magnitude of respective pixel signals S11, the analog-to-digital converter 1212 with the smaller input range and the insufficient resolution performs the analog-to-digital conversion difficultly. Under this circumstance, the fingerprint image acquired in the subsequent step is possibly blurred.

For illustration purpose, we assume the magnitude of each pixel signal S11 from the photosensitive pixel 111 is within the range from 0V to 5V, and the magnitude of the input signal of the analog-to-digital converter 1212 should be within the range from 0V to 1V and the resolution of the analog-to-digital converter 1212 is 1 millivolt (mV). For adjusting the magnitude of the input signal to lie in the allowable range of the analog-to-digital converter 1212, the gain value of the amplifier 1211 is set as 0.1. More particularly, if the magnitudes of two pixel signals S11 transmitted from the photosensitive pixels 111 are 4.001V and 4.002V, respectively. The amplifier 1121 adjusts the two pixel signals S11 and outputs two processed signals S12 with the magnitude of 400.1 mV and 400.2 mV respectively and transmits the processed signals S12 to the analog-to-digital converter 1212. Although the magnitudes of the two processed signals S12 lie in the allowable input range of the analog-to-digital converter 1212, some drawbacks occur. For example, since the resolution of the analog-to-digital converter 1212 is only 1 mV, the two processed signals S12 with the magnitudes of 400.1 mV and 400.2 mV are converted into two digital signals S12' with the magnitude of 400 mV. Thus, since the magnitudes of two digital signals S12' are identical, the signal processing circuit 12 is unable to discriminate the difference between the sensing results of the two photosensitive pixels 111.

For overcoming the drawbacks of the conventional optical fingerprint sensor, an analog-to-digital converter with the wide dynamic input range and the high resolution has been introduced into the market. However, the use of this analog-to-digital converter increases the fabricating cost of the optical fingerprint sensor. Therefore, it is an important issue to provide an optical fingerprint sensor for acquiring a sharp fingerprint image without largely increasing the fabricating cost.

SUMMARY OF THE INVENTION

For solving the drawbacks of the conventional technologies, the present invention provides an optical fingerprint sensor and a fingerprint identification method. The optical fingerprint sensor includes a signal processing circuit. The signal processing circuit includes a variable/programmable gain amplifier, which adaptively switches the gain between a first gain value and a second gain value. After the signals inputted into the variable/programmable gain amplifier are properly processed according to the first gain value or the second gain value, the optical fingerprint sensor may acquires a sharp sensing image.

In accordance with an aspect of the present invention, an optical fingerprint sensor is provided. The optical fingerprint sensor includes a photosensitive element and a signal processing circuit. The photosensitive element includes a plurality of photosensitive pixels. The signal processing circuit includes a logic unit electrically coupled to the photosensitive element, a variable/programmable gain amplifier electrically coupled to the logic unit, and a processing unit electrically coupled to the variable/programmable gain amplifier and the logic unit. The gain of the variable/programmable gain amplifier has two different value. A second gain value is larger than a first gain value. A plurality of pixel signals from the plurality of photosensitive pixels are adjusted by the variable/programmable gain amplifier according to the first gain value, and so that a plurality of first processed signals corresponding to the plurality of pixel signals are generated. A baseline signal is generated by the processing unit according to the plurality of first processed signals. After the baseline signal is subtracted from each pixel signals by the logic unit, a plurality of calibrated signals are generated and sent to the variable/programmable gain amplifier. The variable/programmable gain amplifier then adjusts the plurality of calibrated signal according to the second gain value, so that a plurality of second processed signals corresponding to the plurality of calibrated signals are generated. Thus the processing unit processes the plurality of second processed signals and acquires a sensing image.

In accordance with another aspect of the present invention, a fingerprint identification method is provided. Firstly, a plurality of pixel signals are received from a plurality of photosensitive pixels, and the plurality of pixel signals are adjusted according to a first gain value. Consequently, a plurality of first processed signals corresponding to the plurality of pixel signals are generated. Then, a baseline signal is generated according to the plurality of first processed signals. Then, the baseline signal is subtracted from each pixel signal, so that a plurality of calibrated signals are generated. Then, the plurality of calibrated signals are adjusted according to a second gain value larger than the first gain value. Consequently, a plurality of second processed signals corresponding to the plurality of calibrated signals are generated. Then, the plurality of second processed signals are processed, and thus a sensing image is acquired.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

Figure 1:
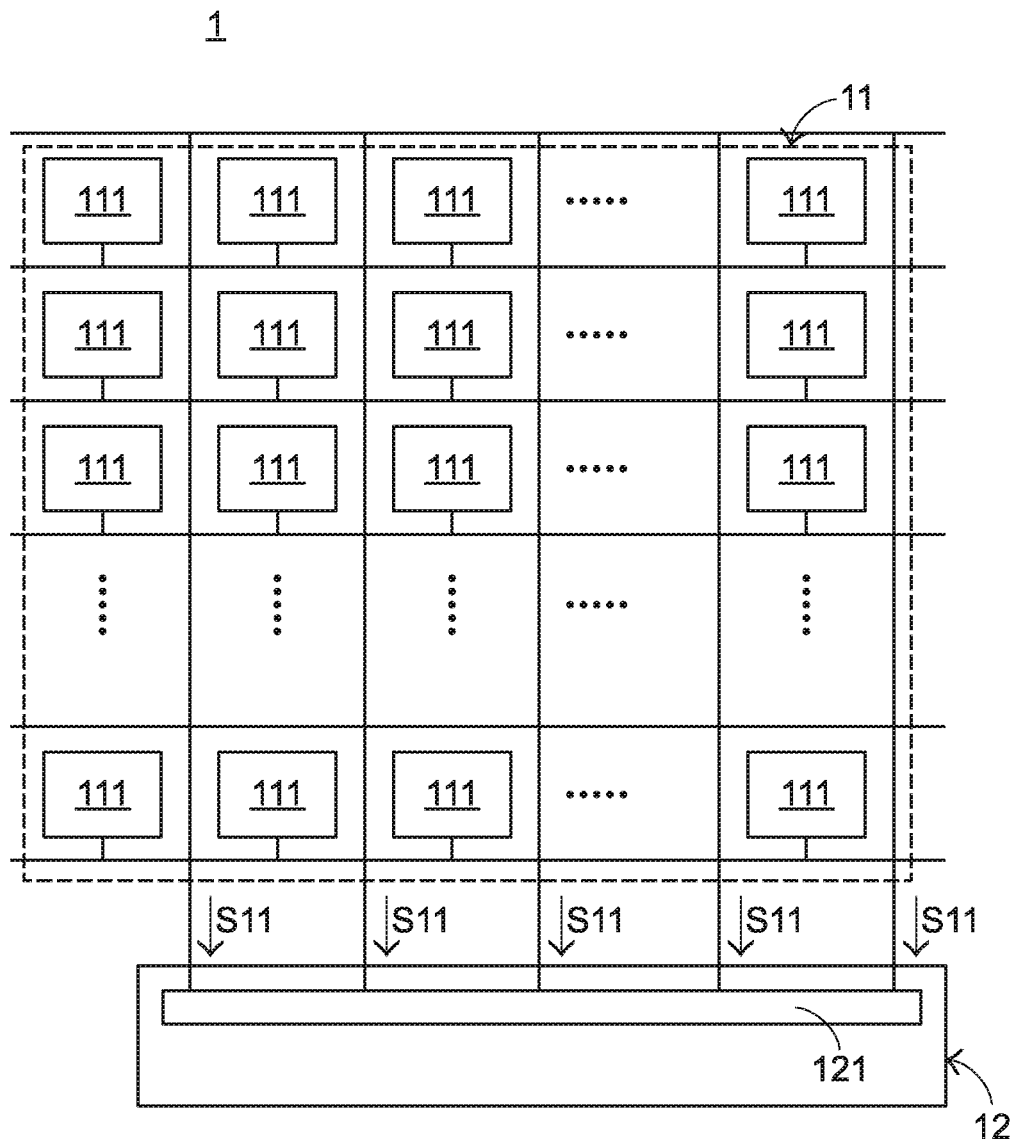
FIG. 1 is a schematic circuit diagram illustrating the architecture of a conventional optical fingerprint sensor.
Figure 2:
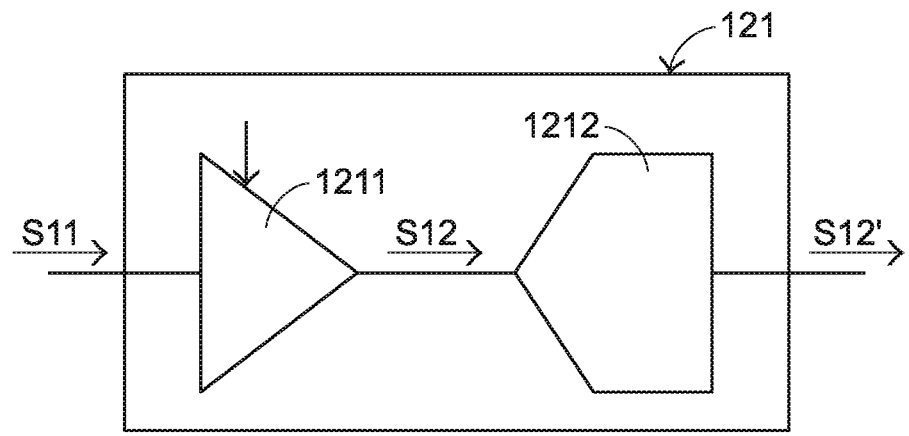
FIG. 2 is a schematic circuit diagram illustrating the analog front end circuit of the optical fingerprint sensor as shown in FIG. 1.

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 3:
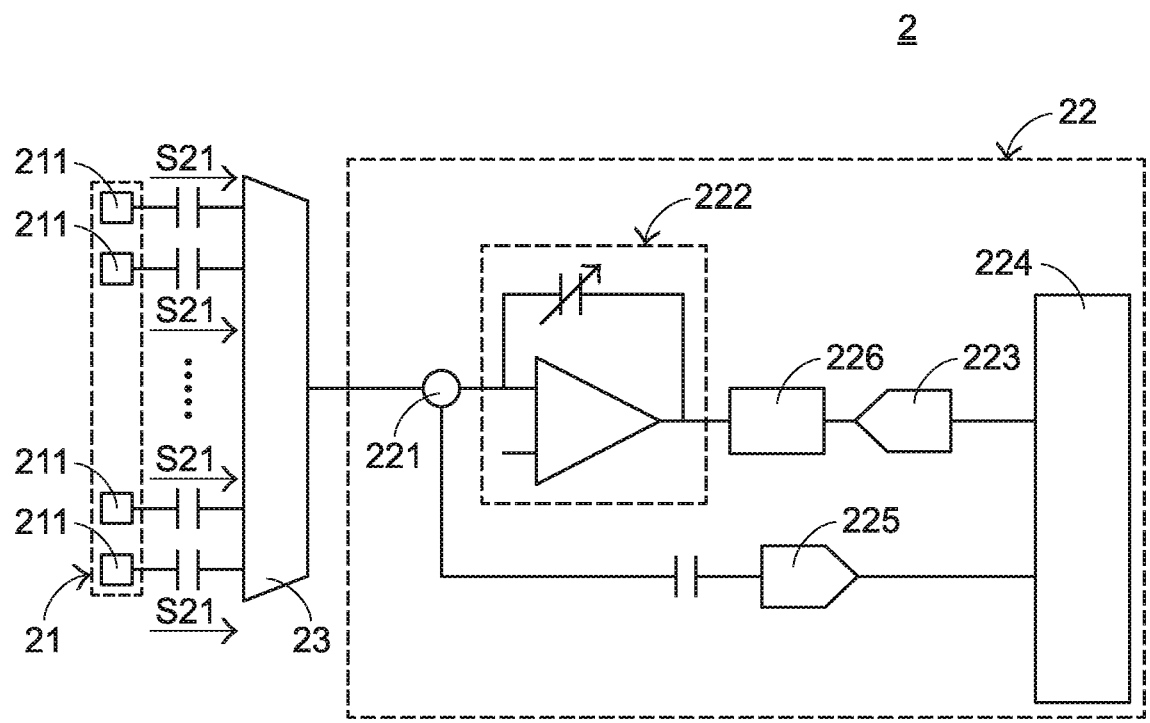
FIG. 3 is a schematic circuit diagram illustrating the architecture of an optical fingerprint sensor according to an embodiment of the present invention.

FIG. 3 is a schematic circuit diagram illustrating the architecture of an optical fingerprint sensor according to an embodiment of the present invention. In an embodiment, the optical fingerprint sensor 2 includes a photosensitive element 21 and a signal processing circuit 22. The photosensitive element 21 includes a plurality of photosensitive pixels 211. During the fingerprint identification process of the optical fingerprint sensor 2, the photosensitive pixels 211 output corresponding pixel signals to the signal processing circuit 22 according to the light amount received by the photosensitive pixels 211. After these pixel signals are processed by the signal processing circuit 22, a plurality of sensing images are acquired. Then, the signal processing circuit 22 outputs a fingerprint image according to the plurality of sensing images. In an embodiment, the photosensitive pixels 211 are arranged in an array. Moreover, the photosensitive pixels 211 are electrically coupled to the signal processing circuit 22 through a multiplexer 23. It is noted that the arrangement of the photosensitive pixels 211 and the connecting relationship between the photosensitive pixels 211 and the signal processing circuit 22 are not restricted and may be varied according to the practical requirements.

In an embodiment, the signal processing circuit 22 includes a logic unit 221, a variable/programmable gain amplifier 222, an analog-to-digital converter (ADC) 223, a processing unit 224 and a digital-to-analog converter (DAC) 225. The logic unit 221 is electrically connected between the photosensitive element 21 and the variable/programmable gain amplifier 222. The analog-to-digital converter 223 is electrically connected between the variable/programmable gain amplifier 222 and the processing unit 224. The digital-to-analog converter 225 is electrically connected between the processing unit 224 and the logic unit 221. Preferably but not exclusively, the variable/programmable gain amplifier 222 is a programmable gain amplifier (PGA) or a variable gain amplifier (VGA).

Figure 4:
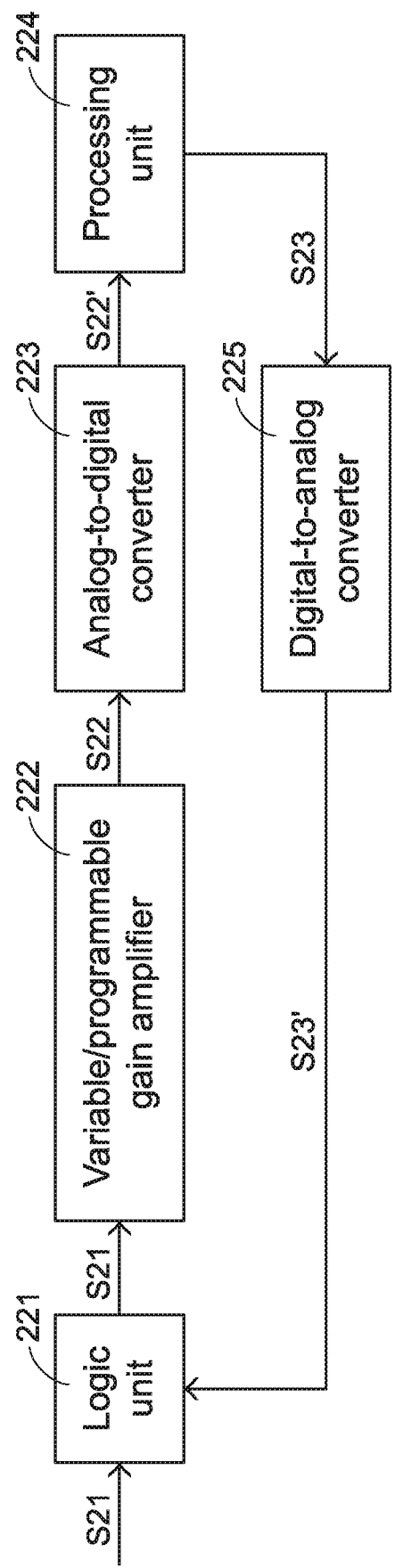
FIG. 4 is a schematic circuit diagram illustrating a portion of a signal transmission path of the signal processing circuit as shown in FIG. 3.
Figure 5:
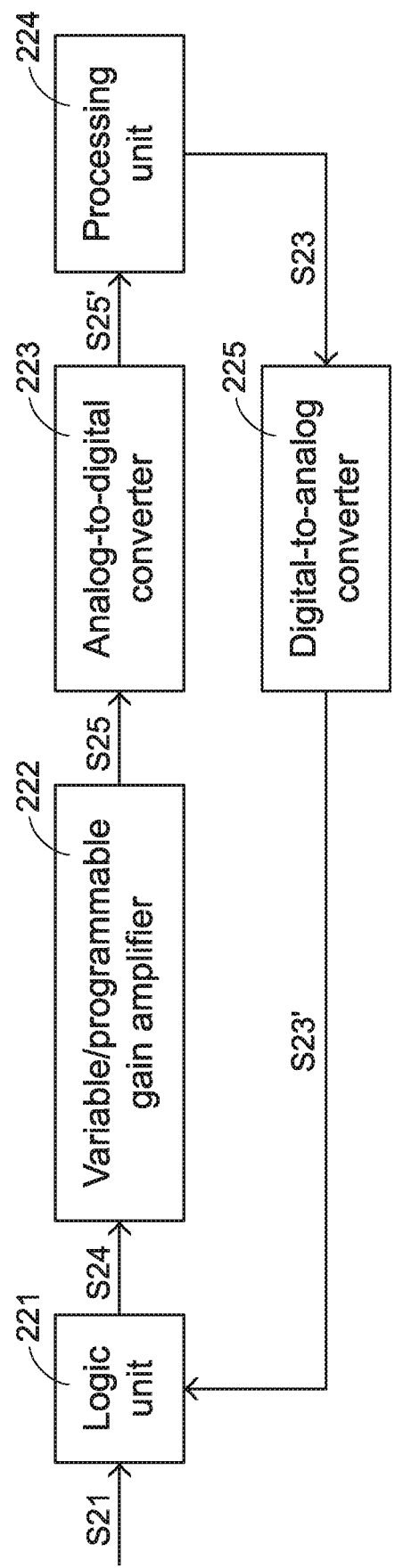
FIG. 5 is a schematic circuit diagram illustrating another portion of a signal transmission path of the signal processing circuit as shown in FIG. 3.

FIG. 4 is a schematic circuit diagram illustrating a portion of a signal transmission path of the signal processing circuit as shown in FIG. 3. FIG. 5 is a schematic circuit diagram illustrating another portion of a signal transmission path of the signal processing circuit as shown in FIG. 3. Hereinafter, the signal transmission path of the signal processing circuit 22 will be described with reference to FIGS. 4 and 5.

Please refer to FIG. 4. When the pixel signals S21 from the photosensitive pixels 211 are inputted into the signal processing circuit 22 for the first time, the pixel signals S21 are directly transferred through the logic unit 221 and received by the variable/programmable gain amplifier 222. After the pixel signals S21 are adjusted by the variable/programmable gain amplifier 222 according to a first gain value, a plurality of first processed signals corresponding to the pixel signals S21 are generated in the analog form (hereinafter referred as first analog signals S22) and transmitted to the analog-to-digital converter 223. Then, the first analog signals S22 are converted into the digital form (hereinafter referred as first digital signals S22') by the analog-to-digital converter 223. Then, the first digital signals S22' are transmitted to the processing unit 224.

Then, a baseline signal in the digital form (hereinafter referred as a first baseline signal S23) is generated by the processing unit 224 according to the first digital signals S22' and the first gain value of the variable/programmable gain amplifier 222. After the first baseline signal S23 is transmitted to the digital-to-analog converter 225, the first baseline signal S23 is converted into the analog form (hereinafter referred as a second baseline signal S23'). Then, the second baseline signal S23' is transmitted to the logic unit 221.

Please refer to FIG. 5. By subtracting the second baseline signal S23' from the pixel signals S21, the logic unit 221 generates a plurality of calibrated signals S24 corresponding to the pixel signals S21. After the calibrated signals S24 are adjusted by the variable/programmable gain amplifier 222 according to a second gain value larger than the first gain value, a plurality of second processed signals corresponding to the calibrated signals S24 are generated in the analog form (hereinafter referred as second analog signals S25) and transmitted to the analog-to-digital converter 223. Then, the second analog signals S25 are converted into the digital form (hereinafter referred as second digital signals S25'), and the second digital signals S25' are transmitted to the processing unit 224. Then, a sensing image is generated by the processing unit 224 according to the second digital signals S25'.

Preferably but not exclusively, the signal processing circuit 22 further includes an anti-aliasing filter (AAF) 226. As shown in FIG. 3, the anti-aliasing filter 226 is electrically connected between the variable/programmable gain amplifier 222 and the analog-to-digital converter 223. The anti-aliasing filter 226 is used for limiting the bandwidth of the signals in at least a portion of the wave band so as to nearly or completely comply with the sampling theorem. The functions and examples of the anti-aliasing filter 226 are well known to those skilled in the art, and are not redundantly described herein.

According to the above circuitry and the above signal transmission path, the optical fingerprint sensor 2 can acquire the sharp sensing image. Hereinafter, the operations and the benefits of the optical fingerprint sensor 2 will be described. For illustration purpose, the magnitude of each pixel signal S21 from the photosensitive pixel 211 is assumed within the range from 0V and 5V. Moreover, the magnitude of the input signal of the analog-to-digital converter 223 is assumed within the range from 0V and 1V, and the resolution of the analog-to-digital converter 223 is 1 millivolt (mV).

In this example, the first gain value and the second gain value of the variable/programmable gain amplifier 222 are set as 0.1 and 10, respectively. For example, the magnitudes of two pixel signals S21 transmitted from the photosensitive pixels 211 to the signal processing circuit 22 are 4.001V and 4.002V, respectively. Please refer to FIG. 4. After the two pixel signals S21 are adjusted by the variable/programmable gain amplifier 222 according to the first gain value, two first analog signals S22 with the magnitudes of 400.1 mV and 400.2 mV are generated and transmitted to the analog-to-digital converter 223. Then, the two first analog signals S22 are converted into two first digital signals S22' by the analog-to-digital converter 223. Then, the two first digital signals S22' are transmitted to the processing unit 224. Since the resolution of the analog-to-digital converter 223 is only 1 mV, the two first analog signals S22 with the magnitudes of 400.1 mV and 400.2 mV are converted into two first digital signals S22' with the magnitude of 400 mV.

Then, a first baseline signal S23 with the magnitude of 4V is generated by the processing unit 224 according to the magnitude (e.g., 400 mV) of the first digital signals S22' and the first gain value (e.g., 0.1) of the variable/programmable gain amplifier 222. Then, the first baseline signal S23 is transmitted to the digital-to-analog converter 225. After the first baseline signal S23 is converted into a second baseline signal S23' by the digital-to-analog converter 225, the second baseline signal S23' is transmitted to the logic unit 221. Please refer to FIG. 5. After the second baseline signal S23' with the magnitude of 4V is subtracted from the two pixel signals S21 with the 4.001V and 4.002V, the logic unit 221 generates two calibrated signals S24 with the magnitudes of 1 mV and 2 mV. After the calibrated signals S24 are adjusted by the variable/programmable gain amplifier 222 according to the second gain value (e.g., 10), two second analog signals S25 with the magnitudes of 10 mV and 20 mV are generated and transmitted to the analog-to-digital converter 223.

Since the resolution of the analog-to-digital converter 223 is 1 mV, the second analog signals S25 with the magnitudes of 10 mV and 20 mV are converted into two second digital signals S25' with the magnitudes of 10 mV and 20 mV by the analog-to-digital converter 223. As mentioned above, the signal processing circuit 12 of the conventional optical fingerprint sensor is unable to discriminate the difference between the sensing results of the two photosensitive pixels 111. According to the present invention, the processing unit 224 is capable of discriminating the difference between the sensing results of the two photosensitive pixels 211. Consequently, the sensing image acquired by the processing unit 224 and corresponding to the two photosensitive pixels 211 is sharp. Obviously, the performance of the optical fingerprint sensor 2 is advantageous over the conventional technology.

When the light field distribution is taken into consideration, the photosensitive element 21 may be divided into a plurality of photosensitive blocks. Moreover, the numbers of the photosensitive pixels 211 in different photosensitive blocks are identical or different. In an embodiment, the first gain value and the second gain value used in the signal processing circuit 22 to process the pixel signals S21 from different photosensitive blocks are not restrictedly the fixed values. For example, if the light field statuses at the position of the first photosensitive block and the position of the second photosensitive block are distinguished, the signal processing circuit 22 processes the plurality of pixel signals 211 from the first photosensitive block according to the first gain value and the second gain value corresponding to the light field status of the first photosensitive block, and the signal processing circuit 22 processes the plurality of pixel signals 211 from the second photosensitive block according to another first gain value and another second gain value corresponding to the light field status of the second photosensitive block.

Moreover, if the conventional optical fingerprint sensor 1 is suffered from noise during the process of capturing the fingerprint texture, the imaging quality is impaired. Generally, the imaging quality is adversely affected by the fixed mode noise the most seriously. The fixed mode noise may be considered as the difference between the pixel signals from various photosensitive pixels 111 under a no light exposure condition or a uniform light exposure condition (i.e., in the same photoelectric signal input condition). One of the reasons that result in the difference between the pixel signals is the mismatch about the minute difference between a plurality of transistors corresponding to these photosensitive pixels 111.

For reducing the influence of the noise, the present invention provides a fingerprint identification method. During the process of capturing the fingerprint texture by the optical fingerprint sensor 2 of the present invention, the signal processing circuit 22 acquires a sensing image (hereinafter referred as a first image) under a zero exposure time condition of the photosensitive pixels 211. Theoretically, in the zero exposure time condition (i.e., the no light exposure condition), there are no differences between the pixel signals from all photosensitive pixels 211. After the differences between the pixel signals from all photosensitive pixels 211 in the no light exposure condition are calculated, the first image containing the information about the fixed mode noise is acquired. Then, during the process of reading the fingerprint texture, these photosensitive pixels 211 undergo the light exposure for a specified exposure time. Consequently, another sensing image (hereinafter referred as a second image) is acquired. Afterwards, the processing unit 224 of the signal processing circuit 22 performs the computation on the first image and the second image. For example, after the first image is subtracted from the second image, the fingerprint image is generated. It is noted that the method of acquiring the information about the fixed mode noise by the signal processing circuit 22 is not restricted and may be varied according to the present invention. The procedures of acquiring the first image and the second image by the signal processing circuit 22 are identical to the above operating procedures of the optical fingerprint sensor 2, and are not redundantly described herein.

Figure 6:
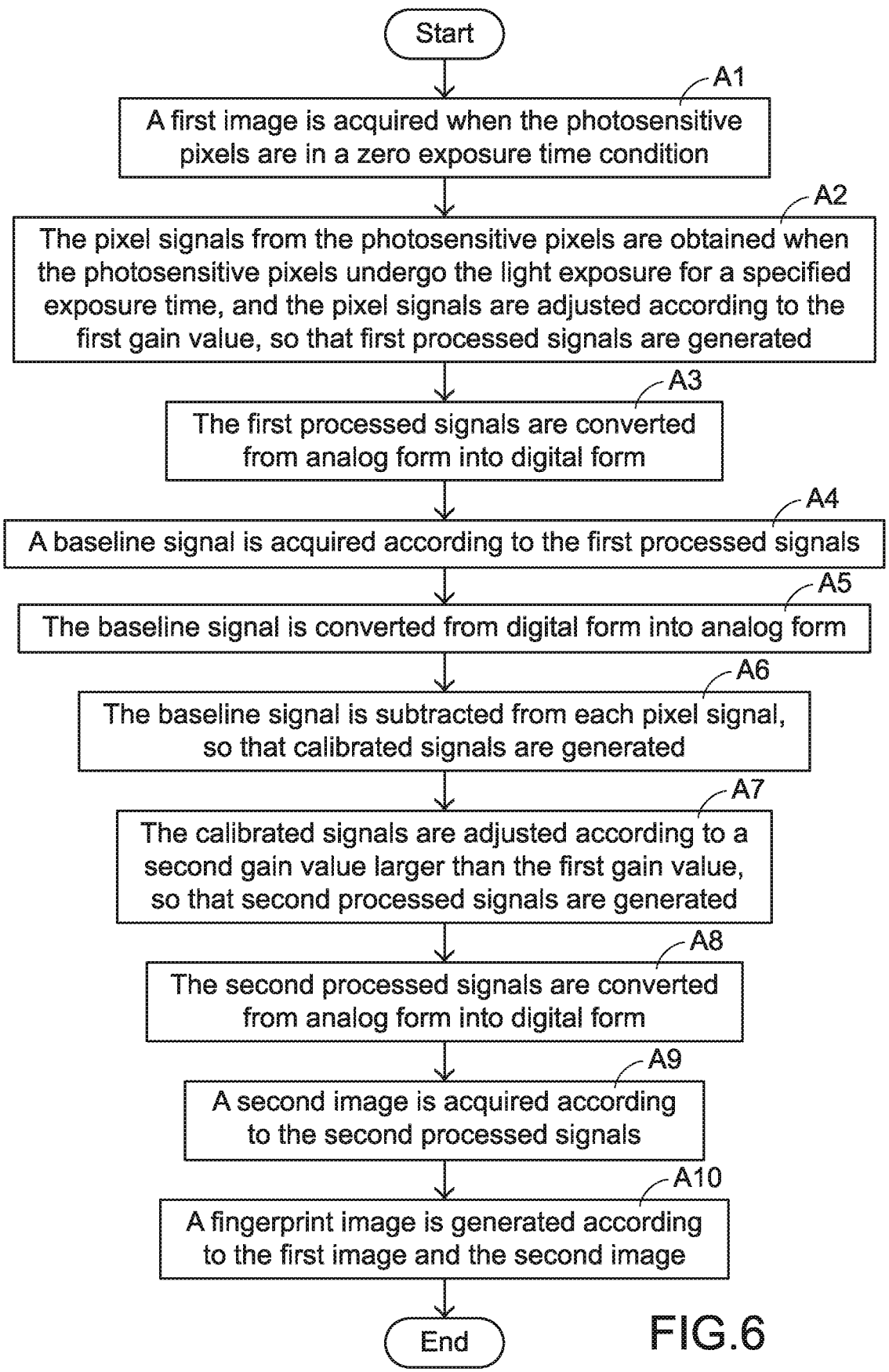
FIG. 6 is a flowchart illustrating a fingerprint identification method according to an embodiment of the present invention.

From the above descriptions, the present invention provides a fingerprint identification method. FIG. 6 is a flowchart illustrating a fingerprint identification method according to an embodiment of the present invention. The fingerprint identification method includes the following steps. In a step A1, a first image is acquired when the photosensitive pixels are in a zero exposure time condition. In a step A2, the pixel signals from the photosensitive pixels are obtained when the photosensitive pixels undergo the light exposure for a specified exposure time, and the pixel signals are adjusted according to the first gain value, so that first processed signals are generated. In a step A3, the first processed signals are converted from analog form into digital form. In a step A4, a baseline signal is acquired according to the first processed signals. In a step A5, the baseline signal is converted from digital form into analog form. In a step A6, the baseline signal is subtracted from each pixel signal, so that calibrated signals are generated. In a step A7, the calibrated signals are adjusted according to a second gain value larger than the first gain value, so that second processed signals are generated. In a step A8, the second processed signals are converted from analog form into digital form. In a step A9, a second image is acquired according to the second processed signals. In a step A10, a fingerprint image is generated according to the first image and the second image.

The procedures of acquiring the first image in the step A1 are similar to those of the steps A2~A9 of FIG. 6 except that the procedures of acquiring the first image are performed in the zero exposure time condition. According to the practical requirements, the procedures of acquiring the first image in the step A1 may be varied. For example, in some embodiments, the pixel signals from the photosensitive pixels are adjusted according to a third gain value and the calibrated signals are adjusted according to a fourth gain value. The third gain value is different from the first gain value. The fourth gain value is different from the second gain value and larger than the than third gain value. Of course, the method of acquiring the first image is not restricted and may be varied according to the practical requirements.

It is noted that numerous modifications and alterations may be made while retaining the teachings of the invention. That is, the above examples may be varied according to the practical requirements. For example, in the above embodiment, the signal processing circuit 22 acquires the first image when the photosensitive pixels 211 are in the zero exposure time condition, and then the signal processing circuit 22 acquires the second image when the photosensitive pixels undergo the light exposure for the specified exposure time. That is, the time point of acquiring the first image by the processing unit 224 is earlier than the time point of acquiring the second image by the processing unit 224. Hereinafter, the time point of acquiring the first image is referred as a first time point, and the time point of acquiring the second image is referred as a second time point. In a variant example, the signal processing circuit 22 acquires the second image when the photosensitive pixels undergo the light exposure for the specified exposure time, and then the signal processing circuit 22 acquires the first image when the photosensitive pixels 211 are in the zero exposure time condition. That is, the time point of acquiring the second image by the processing unit 224 (i.e., the second time point) is earlier than the time point of acquiring the first image by the processing unit 224 (i.e., the first time point). Preferably, the time interval between the first time point and the second time point is shortened. Consequently, the noise generated in the time interval between the first time point and the second time point is reduced, and the fingerprint image outputted from the processing unit 224 is more accurate.

Figure 7:
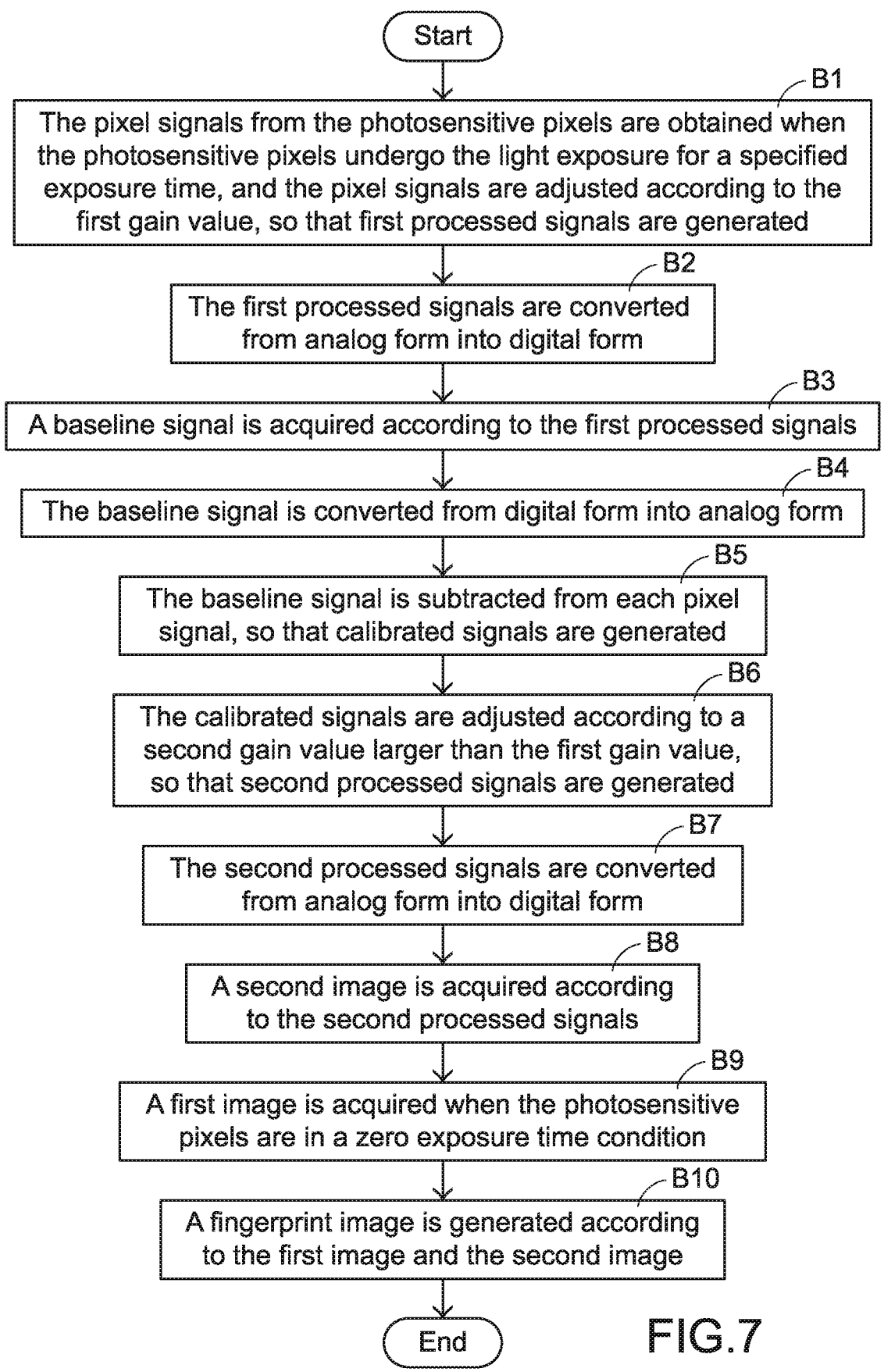
FIG. 7 is a flowchart illustrating a fingerprint identification method according to another embodiment of the present invention.

From the above descriptions, the present invention further provides another fingerprint identification method. FIG. 7 is a flowchart illustrating a fingerprint identification method according to another embodiment of the present invention. The fingerprint identification method includes the following steps. In a step B1, the pixel signals from the photosensitive pixels are obtained when the photosensitive pixels undergo the light exposure for a specified exposure time, and the pixel signals are adjusted according to a first gain value, so that first processed signals are generated. In a step B2, the first processed signals are converted from analog form into digital form. In a step B3, a baseline signal is acquired according to the first processed signals. In a step B4, the baseline signal is converted from digital form into analog form. In a step B5, the baseline signal is subtracted from each pixel signal, so that calibrated signals are generated. In a step B6, the calibrated signals are adjusted according to a second gain value larger than the first gain value, so that second processed signals are generated. In a step B7, the second processed signals are converted from analog form into digital form. In a step B8, a second image is acquired according to the second processed signals. In a step B9, a first image is acquired when the photosensitive pixels is in a zero exposure time condition. In a step B10, a fingerprint image is generated according to the first image and the second image. The procedures of acquiring the first image in the step B9 of FIG. 7 are similar to those of the step A1 of FIG. 6, and are not redundantly described herein.

Figure 8:
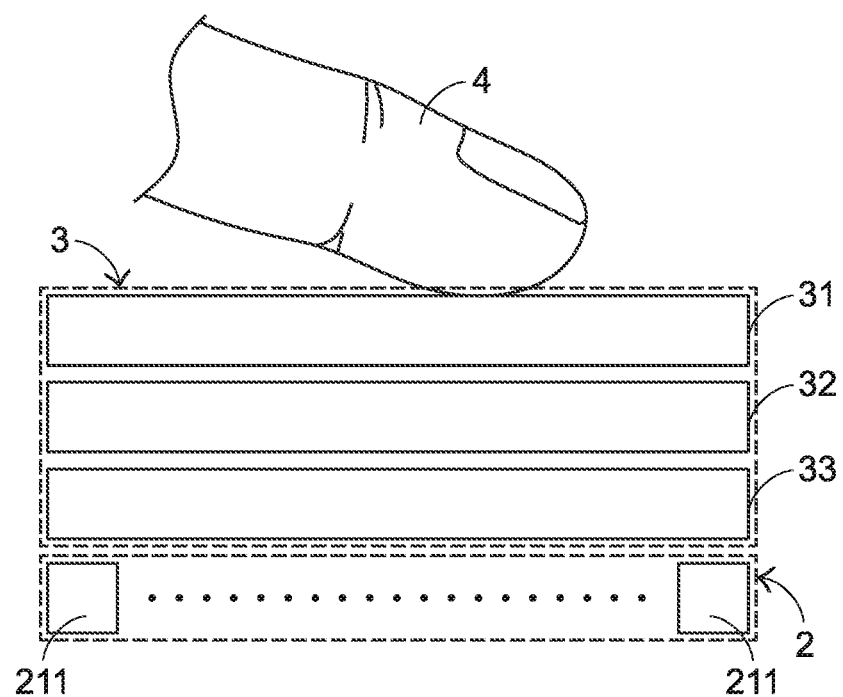
FIG. 8 schematically illustrates the application of the optical fingerprint sensor on a display screen according to an embodiment of the present invention.

Moreover, the optical fingerprint sensor of the present invention may be applied to an on-screen fingerprint sensing (OFS) technology. FIG. 8 schematically illustrates the application of the optical fingerprint sensor on a display screen according to an embodiment of the present invention. The display screen 3 is located over the optical fingerprint sensor 2. From top to bottom, the display screen 3 includes a glass substrate 31, a touch-sensitive layer 32 and a display module 33. A screen image is shown on the display screen 3 for allowing the user to perform the touch control operation. The display module 33 is an OLED display panel, an AMOLED display panel or a TFT display panel. When the user's finger 4 is placed on a top surface of the glass substrate 31, at least portions of the light beams from the display module 33 are projected onto the user's finger 4. The at least portions of light beams are reflected by the user's finger 4 and projected downwardly. After the light beams are transmitted through the gaps of the display module 33, the portions of the light beams are projected onto the photosensitive pixels 211 of the optical fingerprint sensor 2. Consequently, the optical fingerprint sensor 2 generates the fingerprint image. In the above embodiment, the optical fingerprint sensor is applied to the display screen. It is noted that the applications of the optical fingerprint sensor are not restricted. In another embodiment, the display screen does not have the touch control function. Under this circumstance, the display screen is not equipped with the touch-sensitive layer.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An optical fingerprint sensor, comprising:
   a photosensitive element comprising a plurality of photosensitive pixels; and
   a signal processing circuit, comprising:
      a logic unit electrically coupled to the photosensitive element for subtracting a baseline signal from each of a plurality of signals to generate a plurality of calibrated signals;
      a variable/programmable gain amplifier electrically coupled to the logic unit, and switching a gain between a first gain value and a second gain value, wherein the second gain value is larger than the first gain value; and
      a processing unit electrically coupled to the variable/programmable gain amplifier and the logic unit,
   wherein the plurality of pixel signals from the plurality of photosensitive pixels are adjusted by the variable/programmable gain amplifier according to the first gain value, so that a plurality of first processed signals corresponding to the plurality of pixel signals are generated, wherein the baseline signal is generated by the processing unit according to the plurality of first processed signals,
   wherein the plurality of calibrated signals are sent to the variable/programmable gain amplifier, and the variable/programmable gain amplifier then adjusts the plurality of calibrated signal according to the second gain value, so that a plurality of second processed signals corresponding to the plurality of calibrated signals are generated, wherein the processing unit processes the plurality of second processed signals and acquires a sensing image.

2. The optical fingerprint sensor as claimed in claim 1, wherein the signal processing circuit further comprises an analog-to-digital converter electrically connected between the variable/programmable gain amplifier and the processing unit, and wherein the analog-to-digital converter converters and transmits the plurality of first processed signals and the plurality of second processed signals to the processing unit accordingly.

3. The optical fingerprint sensor as claimed in claim 2, wherein the signal processing circuit further comprises an anti-aliasing filter electrically connected between the variable/programmable gain amplifier and the analog-to-digital converter, wherein the anti-aliasing filter limits bandwidths of the plurality of first processed signals and the plurality of second processed signals in at least a portion of a wave band.

4. The optical fingerprint sensor as claimed in claim 1, wherein the signal processing circuit further comprises a digital-to-analog converter electrically connected between the processing unit and the logic unit, and is configured to convert the baseline signal from digital form into analog form and transmits the baseline signal to the logic unit.

5. The optical fingerprint sensor as claimed in claim 1, wherein the processing unit generates a fingerprint image according to a first image and a second image, wherein the first image is acquired by the processing unit when the plurality of photosensitive pixels are under a zero-exposure time condition, and wherein the second image is acquired when the plurality of photosensitive pixels undergo light exposure for a specified exposure time.

6. The optical fingerprint sensor as claimed in claim 5, wherein the first image is acquired earlier than the second image.

7. The optical fingerprint sensor as claimed in claim 5, wherein the second image is acquired earlier than the first image.

8. A fingerprint identification method, comprising steps of:
   (P1) receiving a plurality of pixel signals from a plurality of photosensitive pixels, and adjusting the plurality of pixel signals according to a first gain value, so that a plurality of first processed signals corresponding to the plurality of pixel signals are generated;
   (P2) generating a baseline signal according to the plurality of first processed signals;
   (P3) subtracting the baseline signal from each pixel signal, so that a plurality of calibrated signals are generated;
   (P4) adjusting the plurality of calibrated signals according to a second gain value larger than the first gain value, so that a plurality of second processed signals corresponding to the plurality of calibrated signals are generated; and
   (P5) processing the plurality of second processed signals, so that a sensing image is acquired.

9. The fingerprint identification method as claimed in claim 8, wherein after the step (P1) and before the step (P2), the fingerprint identification method further comprises a step of converting the plurality of first processed signals from analog form into digital form.

10. The fingerprint identification method as claimed in claim 8, wherein after the step (P2) and before the step (P3), the fingerprint identification method further comprises a step of converting the baseline signal from digital into analog form.

11. The fingerprint identification method as claimed in claim 8, wherein after the step (P4) and before the step (P5), the fingerprint identification method further comprises a step of converting the plurality of second processed signals from analog form into digital form.

12. The fingerprint identification method as claimed in claim 8, wherein the fingerprint identification method further comprises a step (P6) of generating a fingerprint image according to a first image and a second image, wherein if the plurality of pixel signals in the step (P1) are acquired when the plurality of photosensitive pixels are in a zero exposure time condition, the sensing image acquired in the step (P5) is the first image, wherein if the plurality of pixel signals in the step (P1) are acquired when the plurality of photosensitive pixels undergo light exposure for a specified exposure time, the sensing image acquired in the step (P5) is the second image.

13. The fingerprint identification method as claimed in claim 12, wherein the first image is acquired earlier than the second image.

14. The fingerprint identification method as claimed in claim 12, wherein the second image is acquired earlier than the first image.

\* \* \* \* \*